(12) United States Patent
Cockeram

(10) Patent No.: US 11,110,681 B2
(45) Date of Patent: Sep. 7, 2021

(54) DIFFUSION BONDED SILICON CARBIDE HAVING IRIDIUM AND HERMETIC SILICON CARBIDE-IRIDIUM BONDS

(71) Applicant: United States Department of Energy, Washington, DC (US)

(72) Inventor: Brian V. Cockeram, West Mifflin, PA (US)

(73) Assignee: U.S. Department of Energy, Washington, DC (US)

( * ) Notice: Subject to any disclaimer, the term of this patent is extended or adjusted under 35 U.S.C. 154(b) by 83 days.

(21) Appl. No.: 16/454,240

(22) Filed: Jun. 27, 2019

(65) Prior Publication Data

US 2019/0329519 A1 Oct. 31, 2019

Related U.S. Application Data

(62) Division of application No. 15/417,293, filed on Jan. 27, 2017, now Pat. No. 10,406,774.

(60) Provisional application No. 62/408,922, filed on Oct. 17, 2016.

(51) Int. Cl.
| | | |
|---|---|---|
| *B23K 1/00* | (2006.01) | |
| *B32B 1/08* | (2006.01) | |
| *B32B 37/10* | (2006.01) | |
| *B32B 15/04* | (2006.01) | |
| *B23K 103/00* | (2006.01) | |
| *B23K 101/04* | (2006.01) | |

(52) U.S. Cl.
CPC .............. *B32B 1/08* (2013.01); *B23K 1/0008* (2013.01); *B32B 15/04* (2013.01); *B32B 37/10* (2013.01); *B23K 2101/04* (2018.08); *B23K 2103/52* (2018.08); *B32B 2309/02* (2013.01); *B32B 2309/04* (2013.01); *B32B 2309/105* (2013.01); *B32B 2309/12* (2013.01); *B32B 2309/68* (2013.01)

(58) Field of Classification Search
CPC ........... B32B 1/08; B32B 37/10; B32B 15/04; B32B 2309/02; B32B 2309/04; B32B 2309/12; B32B 2309/68; B32B 2309/105; B32B 7/04; B32B 9/041; B32B 9/005; B32B 2307/732; B32B 2250/40; B32B 2307/306; B32B 2250/03; B32B 2307/50; B23K 1/0008; B23K 2103/52; B23K 2101/04

See application file for complete search history.

(56) References Cited

U.S. PATENT DOCUMENTS 4,642,864 A * 2/1987 Metcalfe ................ B23K 35/24
165/4
4,663,649 A * 5/1987 Suzuki .................... H01L 23/15
257/746

(Continued)

*Primary Examiner* — Kiley S Stoner
(74) *Attorney, Agent, or Firm* — Robert T. Burns; Jonathan W Parthum; Brian J Lally

(57) ABSTRACT

Disclosed is a hermetic bond for a joint including a first layer of silicon carbide; a second layer of silicon carbide; and a bonding layer positioned between the first layer and the second layer, wherein the bonding layer includes an iridium layer, a first reaction zone positioned between the iridium foil layer and the first layer, and a second reaction zone positioned between the iridium foil layer and the second layer, wherein the first reaction zone and the second reaction zone include iridium silicides.

7 Claims, 6 Drawing Sheets

(56) References Cited

U.S. PATENT DOCUMENTS

| | | | | |
|---|---|---|---|---|
| 4,961,529 A | * | 10/1990 | Gottselig | C04B 35/645 228/122.1 |
| 2003/0038166 A1 | * | 2/2003 | Gasse | B23K 1/19 228/247 |
| 2015/0260316 A1 | * | 9/2015 | Mako, Jr. | B23K 35/361 585/636 |
| 2016/0045878 A1 | * | 2/2016 | Yilmaz | B32B 1/08 427/213 |

* cited by examiner

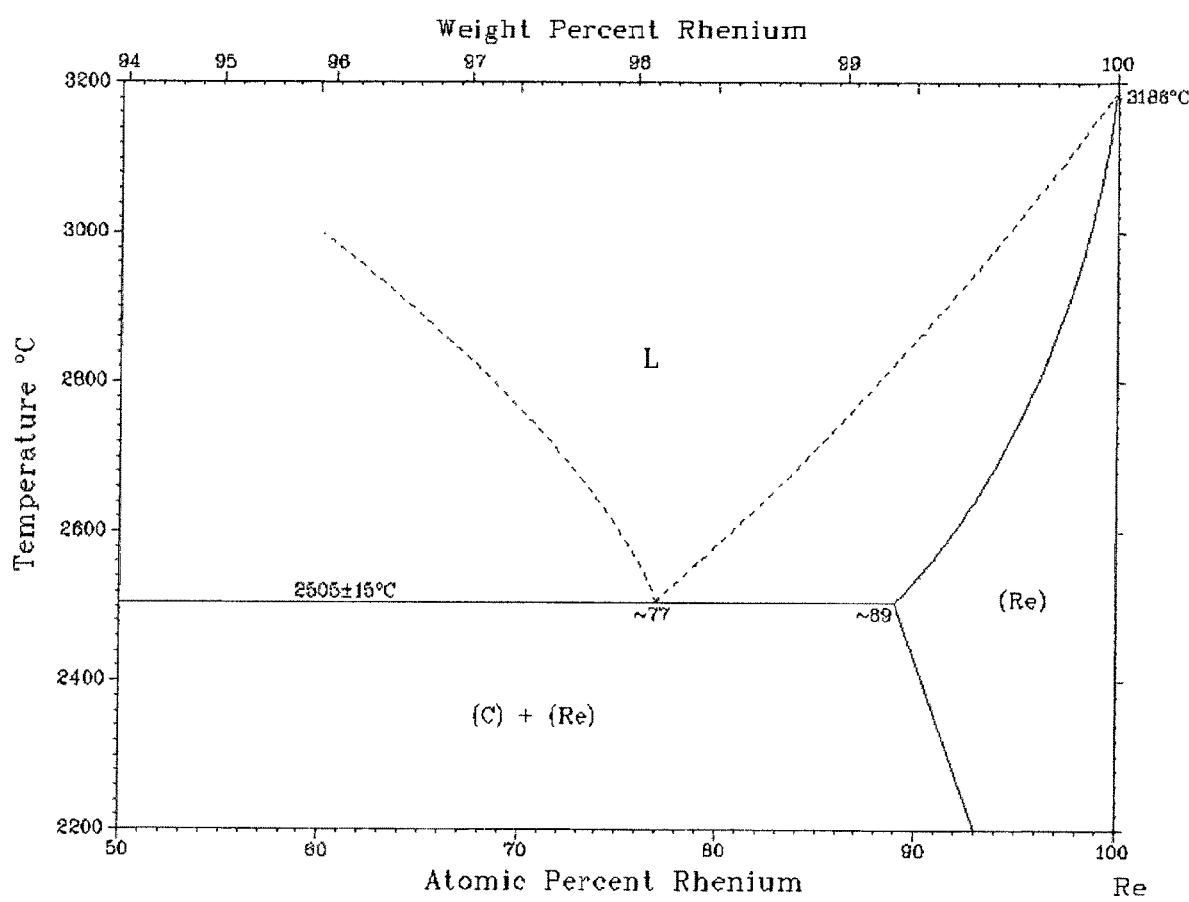
Figure 1. Re-C phase diagram

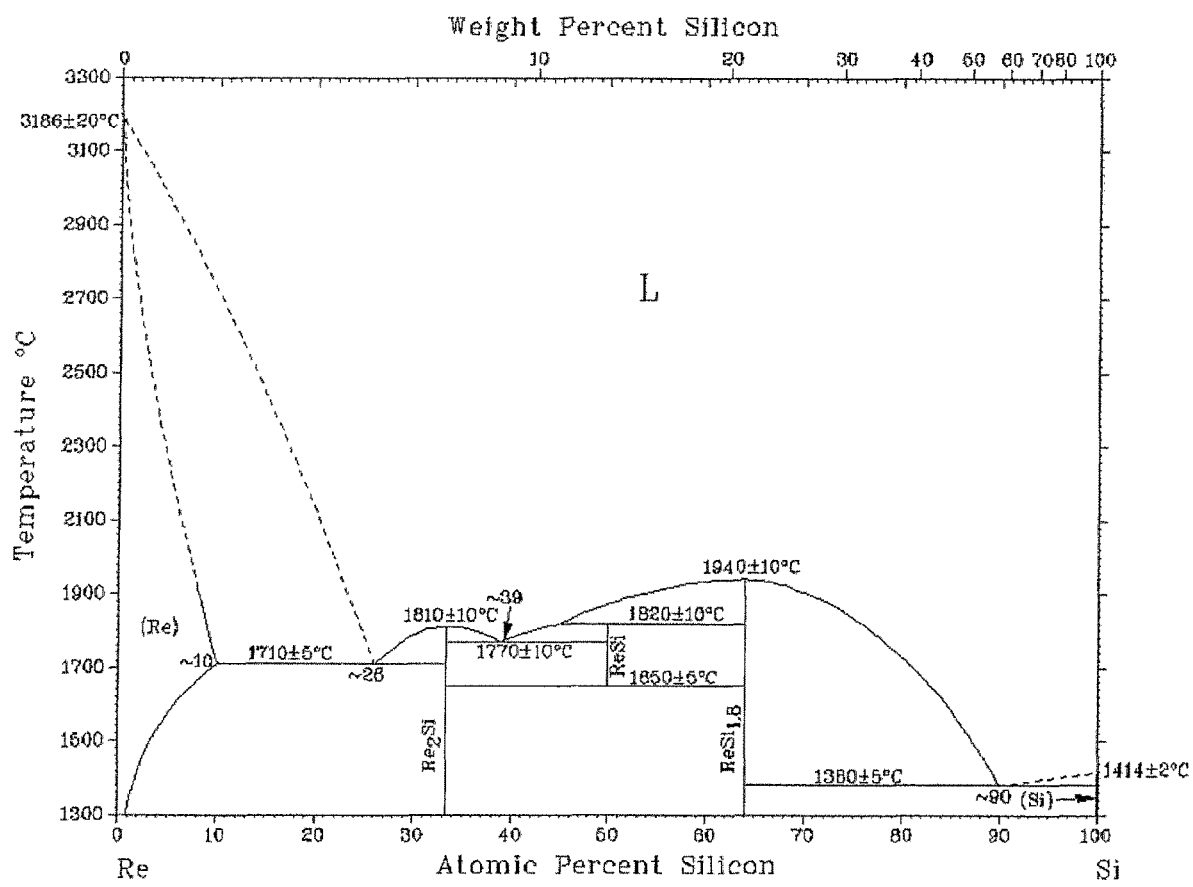
Figure 2. Re-Si phase diagram

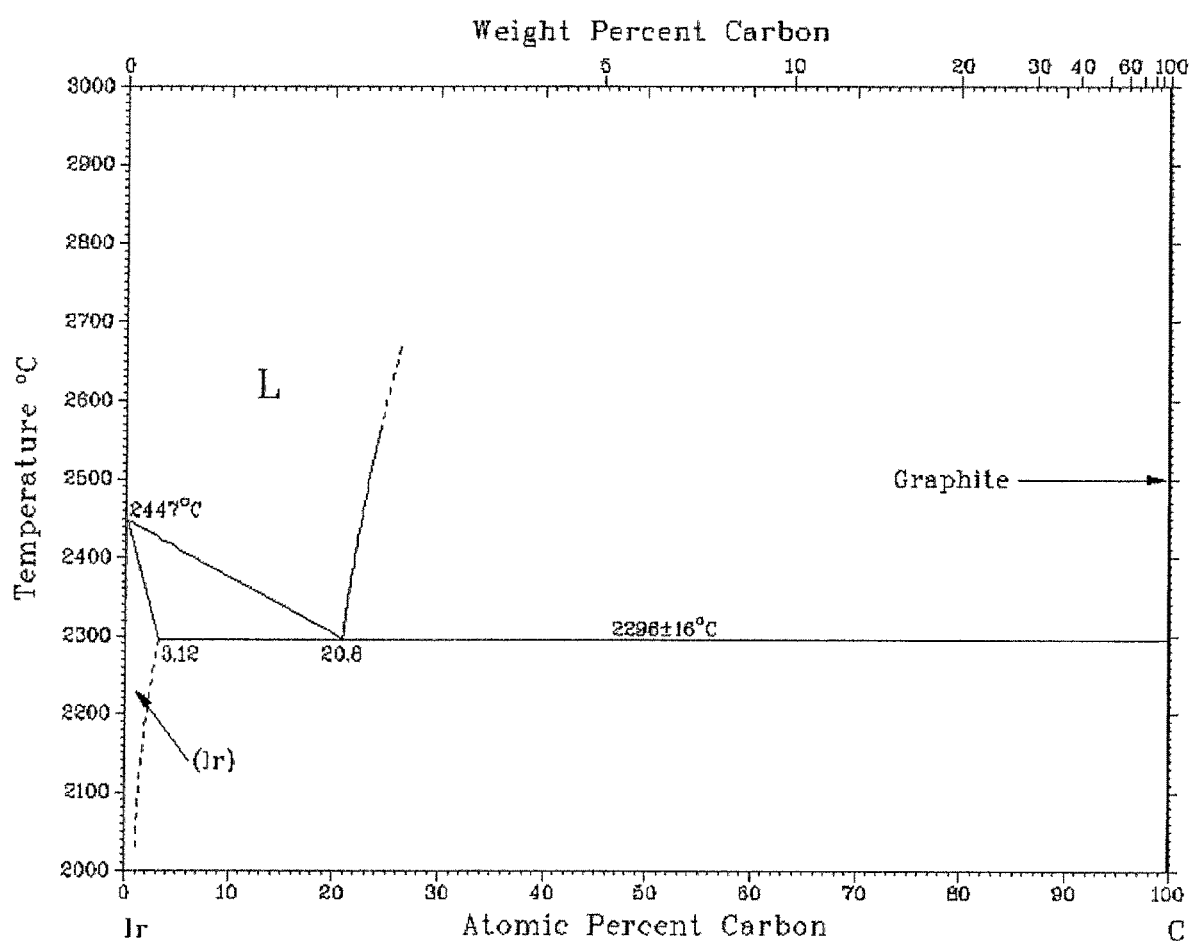
Figure 3. Ir-C phase diagram

DIFFUSION BONDED SILICON CARBIDE HAVING IRIDIUM AND HERMETIC SILICON CARBIDE-IRIDIUM BONDS

CROSS-REFERENCE TO RELATED APPLICATION

This application is a Divisional Application of U.S. Utility application Ser. No. 15/417,293 filed on Jan. 17, 2017, which claims priority to U.S. Provisional Patent Application 62/408,922 filed on Oct. 17, 2016. This application claims priority to both references, both of which are hereby incorporated by reference in their entirety.

GOVERNMENT INTEREST STATEMENT

This invention was made with government support under DOE Contract No. DE-AC11-98PN38206 and Navy Contract No. N00024-98-C-4064. The government has certain rights in the invention.

FIELD

The present subject matter relates generally to bonding SiC using iridium.

BACKGROUND

SiC has been investigated for use at high temperatures, for example, between 500° C. and 1500° C., but achieving such use has been problematic, as methods for forming SiC/SiC joints were susceptible to cracking at these high temperatures. Diffusion bonding is one method used for joining SiC to SiC, and such bonding has been achieved using refractory metals foils such as niobium, titanium, molybdenum, nickel, and tungsten, by the formation of carbide and silicide compounds that produce strong bonding and can survive exposures to high temperature. The problem associated with forming a diffusion bond with SiC using metals such as niobium, titanium, molybdenum, nickel, and tungsten is that these metals are converted into carbide and silicide phases in the joint, which are brittle and susceptible to cracking. The formation of cracks means that a hermetic seal cannot be formed using these processes, and the formation of cracks can reduce the strength of the joints. Additionally, the silicide and carbide phases formed in the joint also typically have different physical properties (coefficient of thermal expansion (CTE), elastic modulus, thermal conductivity, etc.) than the SiC base materials, which can produce stresses during thermal cycling that can lead to cracking in the bond region or the SiC adjacent to the joint.

Other attempts to form a SiC bond with a hermetic seal included a brazing composition of approximately 40 to 97% silicon with the rest selected from the group consisting of chromium, rhenium, vanadium, ruthenium, iridium, rhodium, palladium, cobalt, platinum, cerium, and zirconium with some SiC and/or carbon mixed into the material used to form the bond. Other methods differ because they rely upon the formation of molten silicon with various reinforcement phases (one of which may contain iridium) that are formed in the joint. Still other methods were tried, such as polymer infiltration and reaction forming. These other methods are more complicated than diffusion bonding, require 8 to 14 days of processing time, typically contained free silicon that may be detrimental during irradiation, and are generally non-hermetic. Thus, a need exists for a method of diffusion bonding SiC to form a hermetic seal.

SUMMARY

Disclosed is an exemplary method of bonding silicon carbide, including the steps of inserting an iridium foil between two SiC layers; heating the iridium foil and SiC layers at a temperature of 1500° C. in a vacuum of <10-5 torr; applying a pressure between 1 ksi and 7 ksi to the iridium foil and SiC layers; maintaining the temperature and pressure for 6-10 hours; and forming a hermetic seal having a leak rate <3×10-9 cm3/sec between the iridium foil and the two SiC layers. Other exemplary methods include the steps of the step of forming a joint between the iridium foil and at least one of the SiC layers, wherein approximately ⅓ of the joint is iridium and approximately ⅔ of the joint is a reaction zone at a SiC/iridium interface. In certain exemplary methods, the reaction zone includes iridium-silicides.

Also disclosed is an aspect of a hermetic bond. The hermetic bond includes a first layer of silicon carbide, a second layer of silicon carbide, and a bonding layer positioned between the first layer and the second layer. The bonding layer includes an iridium layer, a first reaction zone positioned between the iridium foil layer and the first layer, and a second reaction zone positioned between the iridium foil layer and the second layer. The first reaction zone and the second reaction zone include iridium silicides.

BRIEF DESCRIPTION OF THE DRAWINGS

A description of the present subject matter including various embodiments thereof is presented with reference to the accompanying drawings, the description not meaning to be considered limiting in any matter, wherein:

FIG. 1 illustrates an exemplary Re—C phase diagram;
FIG. 2 illustrates an exemplary Re—Si phase diagram;
FIG. 3 illustrates an exemplary Ir—C phase diagram.

DETAILED DESCRIPTION

Figure 4A:
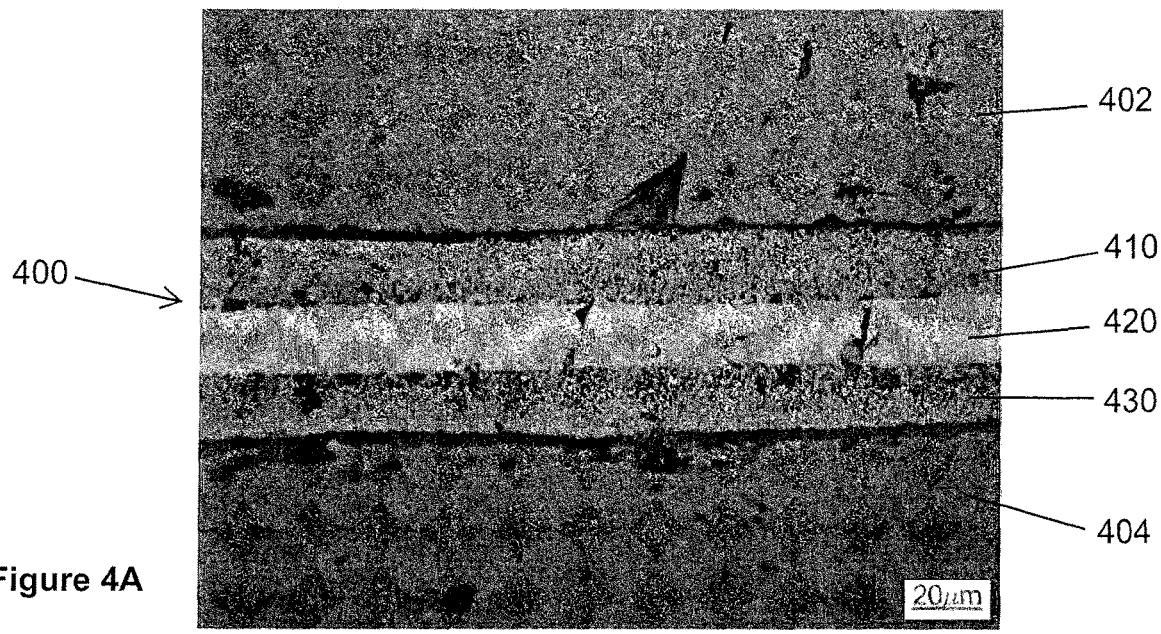
FIGS. 4A-4D illustrate an optical metallography of an exemplary SiC/Ir/SiC bond region.

Throughout the discussion below, use of the terms "about" and "approximately" are used to indicate engineering tolerances which would be well understood by a person of ordinary skill in the art for any particular application or embodiment.

Under certain conditions, diffusion bonding with rhenium foil has been used to produce SiC/rhenium/SiC joints that are hermetic and resistant to thermal cycling and long-thermal thermal exposures at high temperature. It was also found that a hermetic seal can be formed by diffusion bonding SiC with rhenium, as rhenium does not form a stable carbide, rhenium has a relatively high solubility for carbon at high temperature, and only silicide phases are formed. FIGS. 1 and 2 illustrate exemplary Re—C and Re—Si phase diagrams. As discussed below, however, even this technique is problematic, as growth of a Re-silicide layer during long-term annealing to a thickness of above 15 μm at 1100° C. resulted in a loss of hermeticity for SiC/Re joints.

The joint region of a SiC/rhenium/SiC bond made in accordance with the diagrams of FIGS. 1 and 2 includes a thin layer of silicide phase ($Re_5Si_3$) at the rhenium/SiC interface that is only 2-4 μm thick, and the bond consists mostly of rhenium (approximately 92% of the thickness) in the central region of the joint while carbon appears to dissolve into the rhenium metal. The dissolution of carbon into the rhenium means that both carbon and silicon diffuse through the silicide layer ($Re_5Si_3$) in order for the growth of the silicide layer to occur by the reaction of Equation (1):

$$3SiC + 5Re = Re_5Si_3 + 3C$$

Since a carbide phase does not form in the Re—C system and since both carbon and silicon must diffuse through the silicide layer for the growth of the silicide layer to occur by Eq. (1), the growth rate for the silicide layer is extremely slow. The high fraction of rhenium in the joint makes the formation a hermetic seal possible for the SiC/SiC joints produced by rhenium diffusion bonding. The slow growth rate of the Re-silicide layer enables the hermetic seal to be obtained during long exposures at high temperatures. Measurements of growth kinetics predicted that SiC/Re joints would maintain hermeticity for 21,000 to 26,000 hours at 1100° C. and more than 270,000 hours at 1000° C. Annealing SiC/Re joints at 1100° C. for up to 8500 hours resulted in no loss of hermeticity. Even SiC/Re has its drawbacks, as during long-term annealing, the Re-silicide layer grew to a thickness of about 15 which resulted in a loss of hermeticity for SiC/Re joints. Many high temperature, high pressure applications may require hermetic joints, such as where gases are heated to high temperatures and/or high pressure and where seeping of the gases through a joint is undesirable.

Forming a SiC bond using iridium solved many problems of previous bonding mechanisms. FIG. 3 illustrates an exemplary Ir—C phase diagram. Unlike the rhenium-diffusion bonding process, where the hermeticity was lost after the silicide reaction zone grew to about 30% of the joint, using iridium resulted in the formation of a hermetic seal with up to ⅔ or more of the joint in the reaction zone. The iridium diffusion bonding method described here is more resistant to thermal exposures and the resulting interdiffusion in the joint that results from such exposures. Iridium has a larger thermal neutron cross-section than rhenium (about a factor of 2 difference) and is only somewhat larger than natural molybdenum.

In certain exemplary embodiments, a silicon carbide (SiC) ceramic joint has been achieved using a 2 mil thick iridium foil to form a SiC/iridium-foil/SiC bond by heating at 1500° C. in vacuum (pressure ≤$10^{-5}$ torr) for 6 to 10 hours with an applied pressure of 1 ksi to 7 ksi. Achieving such a seal with such a small quantity of iridium in the bond region (0.002″ thickness) is desirable in certain applications, as this amount of iridium would be to result in negligible neutron absorption. Limited conversion of the iridium foil at the SiC interface to form an intermetallic compound that is likely an iridium-silicide phase results in a strong bond for SiC. Other materials were considered, but bonding studies were performed with iridium, rhodium, and palladium, and the most desirable bond region was obtained with iridium. In certain exemplary embodiments, iridium with no other additions is used to bond SiC and produce a hermetic seal. In certain exemplary embodiments, the joint that is hermetic and can be exposed to higher temperatures, such as temperatures greater than 1500° C. and less than 2000° C. (approaching the melting point of iridium.)

Iridium is of particular interest for high temperature, high pressure applications because it has a much higher melting temperature (2454° C.) than the other platinum metals, and has a relatively high solubility for carbon (as shown in FIG. 3, for example). A phase diagram for Ir—Si is not known, but iridium-silicide compounds are known to exist. The structure of the SiC/iridium/SiC joint is different than other SiC/metal/SiC diffusion joints because the limited reaction at the SiC/iridium interfaces produces a joint that is about ⅓ iridium, with no observable cracking of the reaction layer or iridium metal. The high fraction of compliant iridium metal results in the formation of a SiC/iridium/SiC joint that is more resistant to cracking, more durable, and more damage resistant.

One literature paper (J. C. Schuster, Ceram. Trans., vol. 35 (1993), pp. 43-57) discusses the available ternary phase diagram for Si—C—Ir, and based on a preliminary amount of data from an article by A. W. Searcy and L. N. Finnie in the Journal of American Ceramic Society (vol. 45 (1962), pp. 268-73), predicts that interactions between SiC and Ir would result in the formation of four different silicide phases in the joint region. The ternary phase diagram isotherm in the article is hypothetical, is not based on data, and not enough results are available to predict even a binary Ir—Si phase diagram. No bonding experiments or a suggestion of bonding conditions are made. Thus, no information is available in the literature on the bonding of SiC using only iridium metal, or the use of iridium metal to bond SiC and produce a seal that is hermetic. As noted above, various high temperature, high pressure applications involving the heating and containment of gases benefit from a seal that retains hermeticity at high temperatures and high pressures.

Figure 4B:
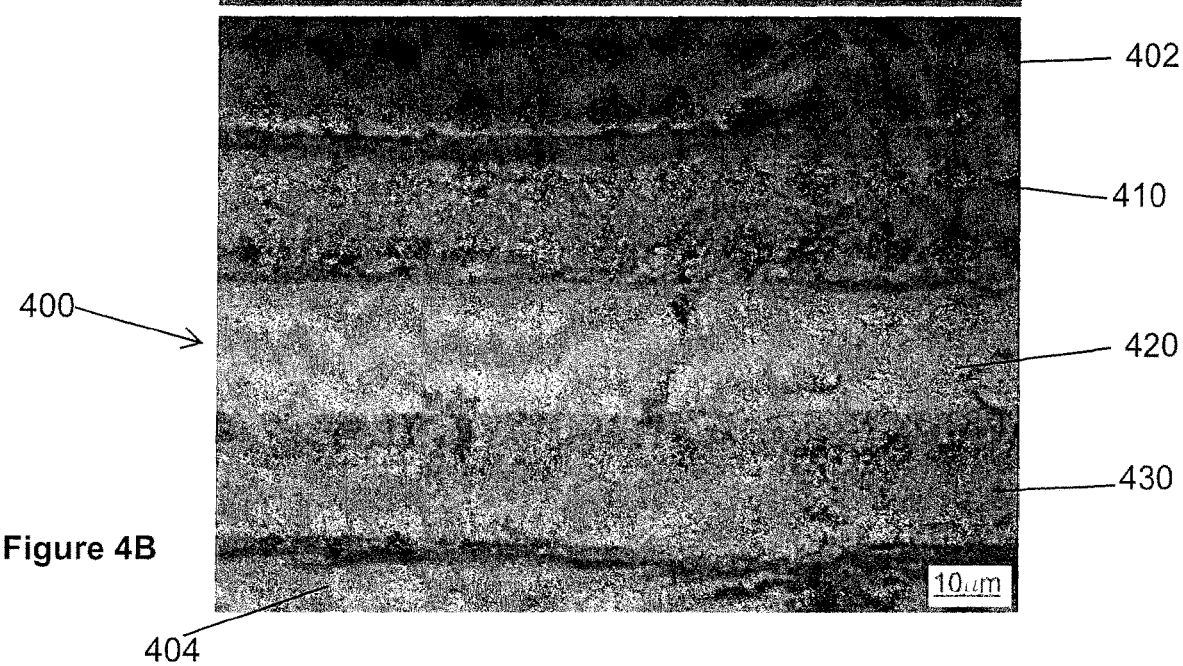
Figure 4C:
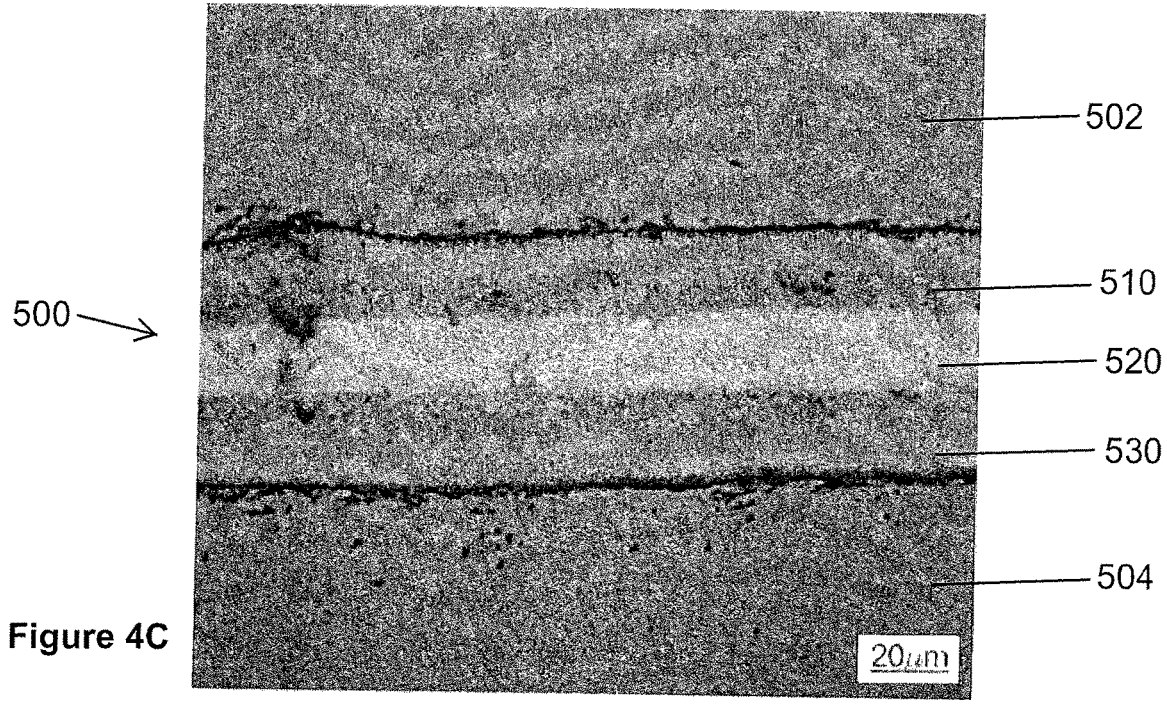
Figure 4D:
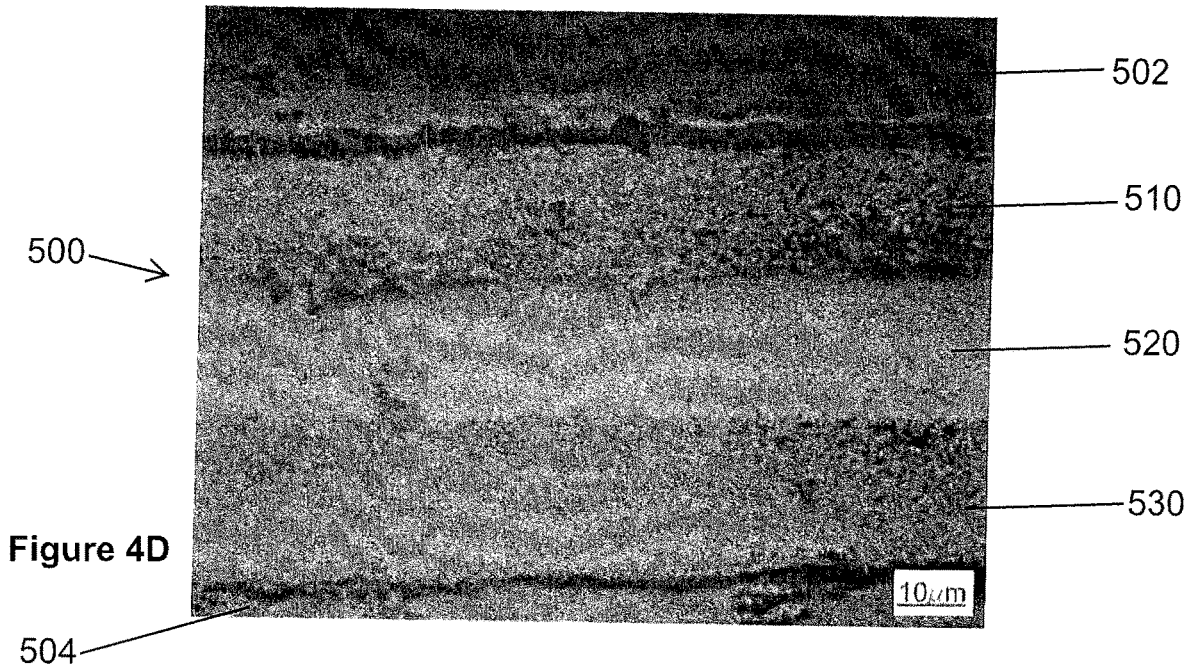

FIGS. 4a-4d illustrate exemplary SiC/iridium/SiC joints formed by vacuum diffusion bonding at 1500° C. for 8 hours with 1.3 ksi of applied pressure (as shown, for example, in Table 1). Specifically, FIGS. 4a and 4b illustrate an optical metallography of an exemplary bond region from SiC/Ir/SiC sandwich bonds formed using an exemplary method under the conditions provided in Table 1 at 500× and 1000× magnification respectively. FIGS. 4c and 4d illustrate another exemplary bond region from SiC/Ir/SiC sandwich bonds at 500× and 1000× magnification respectively.

These ranges are exemplary only, however, as other temperatures and pressures between 1200° C. and 1600° C., plus or minus 20° C., and 1.0 to 7.0 ksi, plus or minus 0.1 ksi, can be used without departing from the scope of the present subject matter. In the exemplary embodiment of FIG. 4, the SiC was Morton (Rohm-Haas) material made by a chemical vapor deposition (CVD) process, which is 100% dense and 99.99% pure.

In certain of the exemplary embodiments, SiC pieces were lapped flat (1-2 Ra) in accordance with MIL-STD-1942A and cleaned by rinsing with acetone, ultrasonically cleaning in alcohol, rinsing in de-ionized water, etching for 2-3 minutes in 50% HF acid, rinsing in acetone again, and a final rinsing with ethanol. The iridium foil was cleaned in ethanol prior to joining. In certain exemplary embodiments, SiC/Ir/SiC sandwiches were positioned in a furnace and a constant load applied on the sandwiches from the start of the bonding run. As shown in FIG. 4, in some embodiments, the bond forms with a first layer of SiC, a second layer of SiC, and a bonding layer disposed between the first layer of SiC and the second layer of SiC. In the embodiment shown in FIG. 4, the bonding layer includes a central layer of iridium, a first reaction zone positioned between the central layer of iridium and the first layer of SiC, and a second reaction zone positioned between the central layer of iridium and the second layer of SiC. The reaction zones are believed to be formed as the SiC and iridium diffuse into each other during the bonding process.

In the exemplary embodiment of FIG. 4, each of the reaction zones at the SiC/Ir interface has a grainy appearance and are each believed to be multi-phase reaction zone that includes iridium-silicides. The middle region/central layer is unreacted iridium metal. Some pull-out is observed in the bond regions that are artifacts of metallographic preparation. Cracks are not visually observed in the bond region under this level of magnification, which indicates that these bonds could form a hermetic seal. The same bond structure was consistently produced in two different bonding runs. Notably, the bond was formed using iridium without additives.

Figure 5:
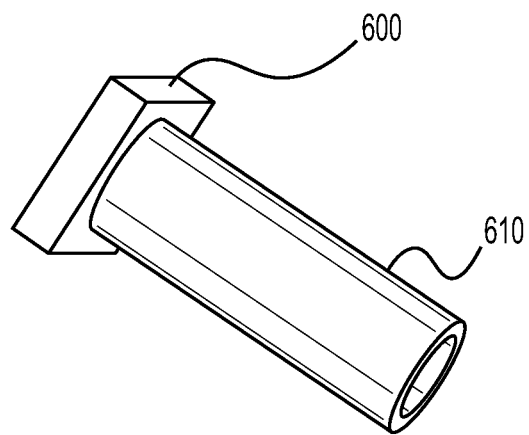
FIG. 5 illustrates an exemplary SiC square to SiC tube bond using iridium foil that was shown to be hermetic with a leak rate ≤3×10$^{-9}$ cm$^3$/s.

FIG. 5 shows a square SiC cap that was diffusion bonded to a SiC tube using iridium foil by vacuum hot pressing (pressure $\leq 10^{-5}$ torr) with 2.7 ksi of applied pressure at 1500° C. for eight hours, under the conditions shown in Table 2. The exemplary bond formed a hermetic seal with a leak rate $\leq 3\times 10^{-9}$ cm$^3$/sec using a 2-mil thick iridium foil. In other embodiments, the iridium foil may have a thickness ranging from 1 mil to 10 mil. Prior to joining, the SiC cap and tube end were lapped flat to a diamond polish (1-2 Ra) in accordance with MIL-STD-1942A and cleaned using the methods described above. Leak checking revealed that the seal between the cap and tube was hermetic, and the leak rate was $<3\times 10^{-9}$ cm$^3$/sec.

Table 1 illustrates an exemplary summary of initial diffusion bonding parameters used to produce the SiC/Ir/SiC sandwich bonds with chemical vapor deposition (CVD SiC) as shown, for example, in FIG. 4.

TABLE 1

| | |
|---|---|
| Test Coupon Size | Approximately 0.5" × 0.5" × 0.125" (SiC) |
| Pieces to bonded | CVD SiC (Morton or Rohm-Haas) |
| Metal Foil | Iridium (2 mils thick) |
| Processing | Vacuum Hot Pressing (pressure < 10$^{-5}$ torr) |
| Temperature | 1500° C. |
| Hold Time at Temperature | 8 hours |
| Applied Pressure | 1.28 ksi |
| Atmosphere | Helium |

Table 2 illustrates a summary of exemplary diffusion bonding parameters used to produce a SiC cap on a SiC tube seal with iridium foil that was shown to be hermetic as shown, for example, in FIG. 5.

TABLE 2

| | |
|---|---|
| Tube Size | Approximately 1.0" long × 0.255" ID and 0.375" OD |
| Cap Size | approximately 0.5" × 0.5" × 0.125" |
| Pieces to bonded | CVD SiC (Morton or Rohm-Haas) |
| Metal Foil | Iridium (2 mils thick) |
| Processing | Vacuum Hot Pressing (pressure < 10$^{-5}$ torr) |
| Temperature | 1500° C. |
| Hold Time at Temperature | 8 hours |
| Applied Pressure | 2.7 ksi |
| Furnace Atmosphere | Helium with less than 1 ppm each of oxygen, nitrogen, and moisture |

Table 3 illustrates an exemplary range of diffusion bonding parameters used for diffusion bonding SiC using iridium foil.

TABLE 3

| | |
|---|---|
| Parts to be joined | tubes, caps, or flats |
| Pieces to bonded | CVD SiC (Morton or Rohm-Haas) |
| Metal Foil | Iridium (1-4 mils thick) |
| Processing Atmosphere | Vacuum Hot Pressing (pressure < 10$^{-5}$ torr) or Inert Atmosphere (Helium or Argon) |
| Temperature | 1200° C. to 1600° C. |
| Hold Time at Temperature | 4 to 12 hours |
| Applied Pressure | 1.0 to 7.0 ksi |
| Furnace Atmosphere | Helium or Argon with less than 1 ppm each of oxygen, nitrogen, and moisture |

Although only helium and argon are shown in the tables, other noble gases can be used without departing from the scope of the present subject matter.

CONCLUSION

It will be understood that many additional changes in the details, materials, steps and arrangement of parts, which have been herein described and illustrated to explain the nature of the subject matter, may be made by those skilled in the art within the principle and scope of the invention as expressed in the appended claims. The steps of the methods described above may be performed in any order unless the order is restricted in the discussion. Any element of any embodiment may be used in any other embodiment and/or substituted for an element of any other embodiment unless specifically restricted in the discussion.

What is claimed is:
1. A hermetic bond for a joint, comprising:
   a first layer of silicon carbide;
   a second layer of silicon carbide; and
   a bonding layer positioned between the first layer and the second layer, wherein the bonding layer includes:
   an iridium foil layer with no additives,
   a first reaction zone positioned between the iridium foil layer and the first layer, and
   a second reaction zone positioned between the iridium foil layer and the second layer, wherein the first reaction zone and the second reaction zone include iridium silicides.
2. The hermetic bond of claim 1, wherein the bond has a hermetic leak rate of <3×10-9 cm3/sec between the bonding layer and the first layer and second layer.
3. The hermetic bond of claim 1, wherein the bonding layer includes iridium foil having a pre-bonding thickness between about 1 mil to about 10 mil.
4. The hermetic bond of claim 1, wherein the joint is about one-third iridium.
5. The hermetic bond of claim 1, wherein the joint has no visually observable cracks in any of the first reaction zone, the second reaction zone, and the iridium layer.
6. The hermetic bond of claim 1, wherein one of the first layer and the second layer is tubular.
7. The hermetic bond of claim 6, wherein the other of the first layer and the second layer is a cap.

* * * * *